(12) United States Patent
Raftelis et al.

(10) Patent No.: US 8,085,681 B2
(45) Date of Patent: Dec. 27, 2011

(54) CENTRALIZED ANALYSIS AND MANAGEMENT OF NETWORK PACKETS

(75) Inventors: Michael Raftelis, San Antonio, TX (US); Mohamed Dagash, Somerset, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 220 days.

(21) Appl. No.: 12/255,037

(22) Filed: Oct. 21, 2008

(65) Prior Publication Data

US 2010/0097945 A1      Apr. 22, 2010

(51) Int. Cl.
*G06F 11/30* (2006.01)
*H04L 1/00* (2006.01)
*H04L 12/26* (2006.01)

(52) U.S. Cl. ............. 370/252; 370/235; 726/23; 726/25
(58) Field of Classification Search .................. 370/229, 370/235, 252, 253; 726/2, 5, 6, 7, 11, 13, 726/15, 22, 23, 25
See application file for complete search history.

(56) References Cited

U.S. PATENT DOCUMENTS

| | | | |
|---|---|---|---|
| 7,328,349 B2* | 2/2008 | Milliken | 713/181 |
| 7,436,770 B2* | 10/2008 | Sterne et al. | 370/235 |
| 7,594,009 B2* | 9/2009 | Triulzi et al. | 709/224 |
| 2002/0166063 A1* | 11/2002 | Lachman et al. | 713/200 |
| 2003/0145232 A1* | 7/2003 | Poletto et al. | 713/201 |
| 2004/0054925 A1* | 3/2004 | Etheridge et al. | 713/201 |
| 2004/0128550 A1* | 7/2004 | Govindarajan et al. | 713/201 |
| 2004/0193943 A1* | 9/2004 | Angelino et al. | 714/4 |
| 2004/0250124 A1* | 12/2004 | Chesla et al. | 713/201 |
| 2005/0195748 A1* | 9/2005 | Sanchez | 370/252 |
| 2006/0010389 A1* | 1/2006 | Rooney et al. | 715/736 |
| 2006/0075084 A1* | 4/2006 | Lyon | 709/223 |
| 2008/0052774 A1* | 2/2008 | Chesla et al. | 726/13 |
| 2008/0253380 A1* | 10/2008 | Cazares et al. | 370/395.53 |
| 2008/0271146 A1* | 10/2008 | Rooney et al. | 726/23 |
| 2010/0082513 A1* | 4/2010 | Liu | 706/46 |

* cited by examiner

*Primary Examiner* — Chi Pham
*Assistant Examiner* — Ahmed Elallam
(74) *Attorney, Agent, or Firm* — Hope Baldauff Hartman, LLC

(57) ABSTRACT

This description provides tools and techniques for centralized analysis and management of network packets. These tools may provide methods that include storing network packets as identified by packet-detecting devices within networks. These methods may also define baseline behavior patterns applicable to the network, as well as thresholds applicable to deviations in network behavior, relative to the baseline behavior patterns. These methods may also identify attacks against the network, as exhibited by deviations in the behavior patterns that exceed the threshold.

18 Claims, 6 Drawing Sheets

CENTRALIZED ANALYSIS AND MANAGEMENT OF NETWORK PACKETS

BACKGROUND

As data communications networks continue to grow and proliferate, the size, complexity, and scope of these networks have increased accordingly. Various network components are available that identify certain network packets as suspicious or malicious in nature, and discard them. In this manner, these network components may serve a protective function, isolating other network components from harm that may be caused by processing these malicious packets. However, typically these network components operate alone, and discarded packets are not analyzed further.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This description provides tools and techniques for centralized analysis and management of network packets. These tools may provide methods that include storing network packets as identified by packet-detecting devices within networks. These methods may also define baseline behavior patterns applicable to the network, as well as thresholds applicable to deviations in network behavior, relative to the baseline behavior patterns. These methods may also identify attacks against the network, as exhibited by deviations in the behavior patterns that exceed the threshold.

Other apparatus, systems, methods, and/or computer program products according to embodiments will be or become apparent to one with skill in the art upon reviewing the following drawings and Detailed Description. It is intended that all such additional apparatus, systems, methods, and/or computer program products be included within this description, be within the scope of the claimed subject matter, and be protected by the accompanying claims.

DETAILED DESCRIPTION

The following detailed description is directed to methods, systems, and computer-readable media for centralized analysis and management of network packets. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
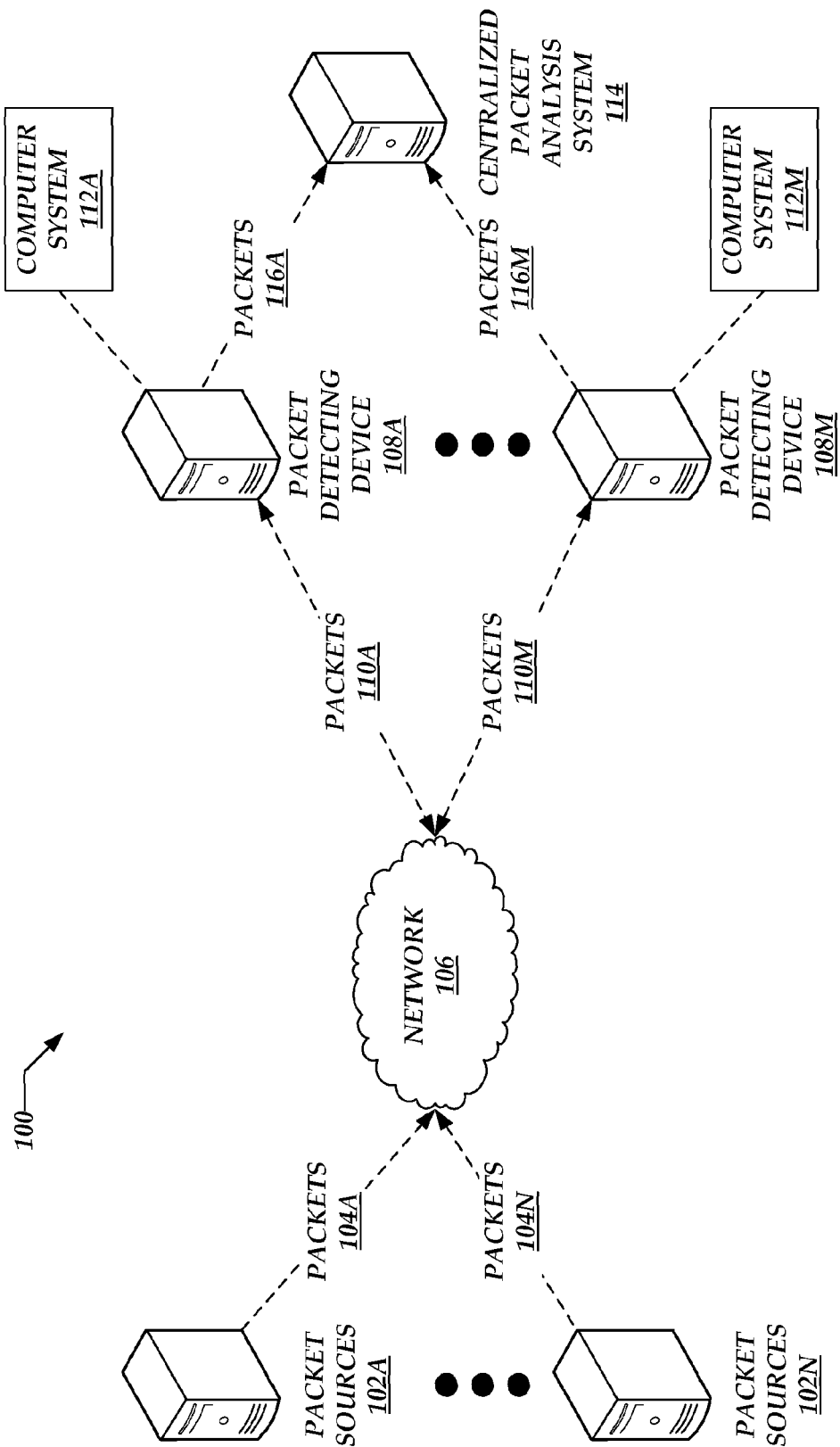
FIG. 1 is a combined block and flow diagram illustrating systems or operating environments for centralized analysis and management of network packets, according to exemplary embodiments.

FIG. 1 illustrates systems or operating environments, denoted generally at 100, for centralized analysis and management of network packets. These systems 100 may include any number of packet sources 102a and 102n (collectively, packet sources 102), which may operate to inject corresponding packets 104a and 104n (collectively, packets 104) into a network 106. The packet sources 102 may represent, for example, network servers or other computer-based systems that generate and transmit the packets 104. In turn, the packets 104 may adopt any particular format or layout as appropriate in different applications, considering different types of network protocols available in different implementations scenarios. The network 106 generally represents any protocols, adapters, components, and other general infrastructure associated with wired and/or wireless communications networks. Such networks 106 may be global, regional, local, and/or personal in scope and nature, as appropriate in different implementations, and may be configured as appropriate to transmit voice and/or data.

These systems 100 may also include any number of packet detecting devices 108a and 108m (collectively, packet detecting devices 108), with these devices 108 operative to receive and process packets 110a and 110m (collectively, packets 110) from the network 106. These packets 110 may correspond to the packets 104 transmitted by the packet sources 102, and may represent packets incoming from these packet sources. However, the packets 110 may also include packets originating at receiving systems (not shown), with these packets being generated in response to the packets 104. In such cases, the packets 104 may cause the receiving systems to participate in a particular attack, for example, by forcing particular responses from the receiving systems. The packet detecting devices 108 may, for example, represent firewalls or other network components operative to receive and process the packets 110, and possibly identify at least some of these packets 110 as malicious in nature, whether these packets originated at the sources 102 or originated at other receiving systems.

In different possible scenarios, the packet detecting devices 108 may function as firewalls that protect one or more corresponding computer systems 112a and 112m (collectively, protected computer systems 112) from possible malicious packets 110. These firewalls may operate as hardware or software components, or as services operating on behalf of the protected computer systems 112.

In some cases, individual packets 110 may be deemed malicious. For example, in some scenarios, one or more of the packet sources 102 may become infected by viruses or other malware that cause the packet sources 102 to emit packets bearing the viruses or malware to other systems across the network 106. In this manner, the viruses or other malware may attempt to propagate themselves to other components or elements accessible via the network 106, by spreading malicious packets across the network.

In other cases, the individual packets 110 themselves may not be malicious when considered alone, but may become malicious when considered collectively. For example, in a distributed denial-of-service attack, a malicious packet source 102 may target one or more given computer systems (e.g., protected systems 112) over the network 106 by bombarding the targeted computer system with an excessive number of packets 104. In an example scenario, the targeted computer system may host or support a given website or online merchant. In connection with this denial-of-service attack, the individual packets 104 bombarding the targeted computer system may appear legitimate when considered individually. However, when excessive numbers of the packets 104 are directed against the targeted computer systems in a short period of time, these packets may become malicious in nature.

As the packet detecting devices 108 identify various packets 110 as possibly being malicious, the detecting devices 108 may discard these malicious packets, thereby blocking them from reaching the protected computer systems 112. In turn, a centralized packet analysis system 114 may receive packets 116a and 116m (collectively, packets 116). The packets 116 may include discarded, malicious packets, but may also include packets that are analyzed, but not necessarily marked as malicious and discarded. As described in further detail below, the packet analysis system 114 may process packets 116 received from a variety of different packet detecting devices 108. In this manner, the packet analysis system 114 may consolidate packet processing on behalf of these different packet detecting devices 108, thereby providing a centralized service that offloads the overhead associated with processing these packets from the packet detecting devices 108.

Having described the overall operating environments or systems 100 in FIG. 1, the discussion now turns to a more detailed description of components and data flows associated with the packet analysis system 114. This description is now provided with FIG. 2.

Figure 2:
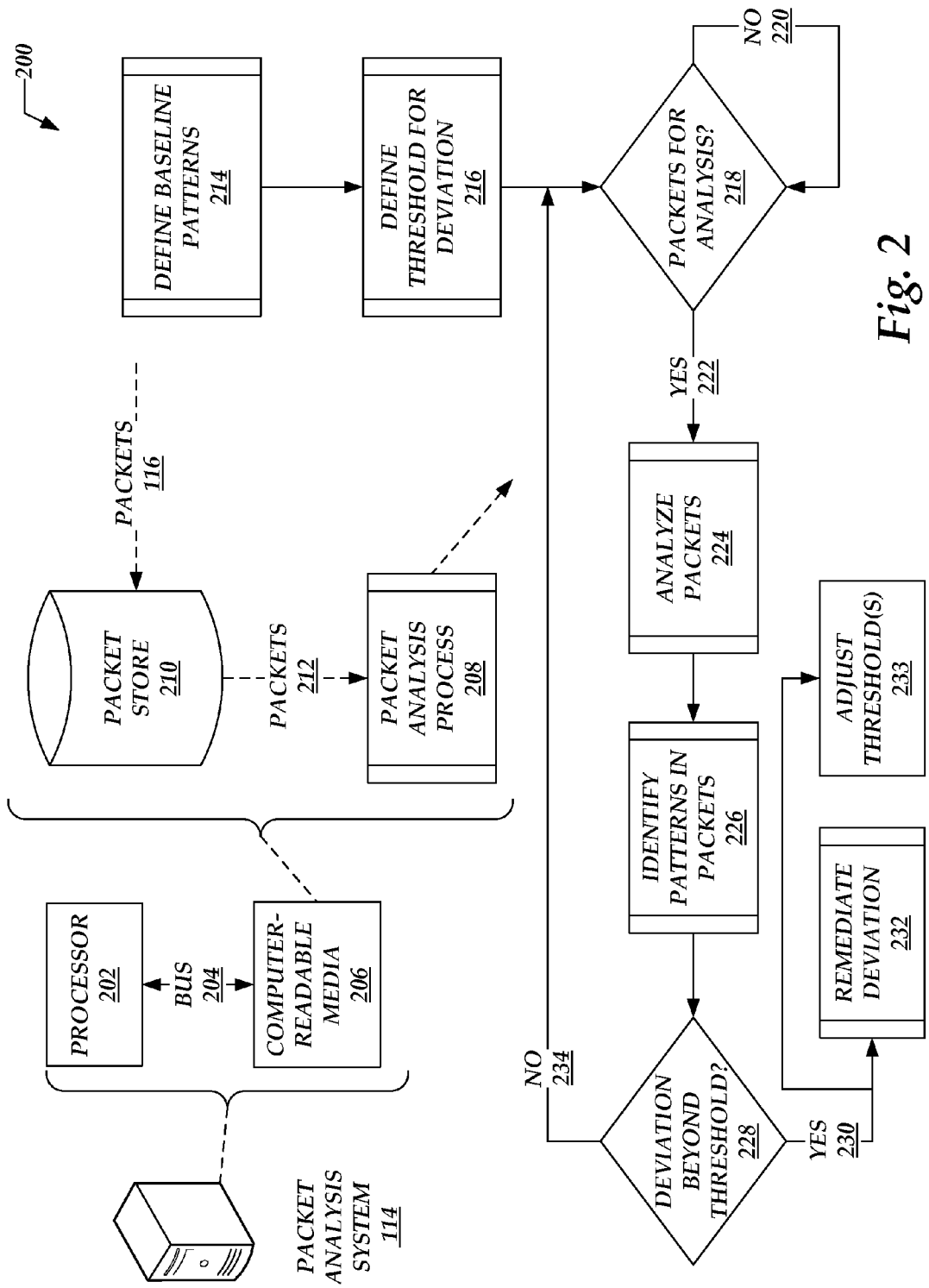
FIG. 2 is a combined block and flow diagram illustrating components and flows associated with packet analysis systems suitable for implementing centralized analysis and management of network packets, according to exemplary embodiments.

FIG. 2 illustrates more detailed components and flows, denoted generally at 200, associated with packet analysis systems suitable for implementing centralized analysis and management of network packets. For convenience of description, but not to limit possible implementations, FIG. 2 may carry forward some items introduced in previous drawings, and may refer to such items by identical reference numbers. For example, FIG. 2 carries forward an example of the packet analysis systems at 114.

Turning to the packet analysis systems 114 in more detail, these systems may include one or more processors 202, which may have a particular type or architecture, chosen as appropriate for particular implementations. The processors 202 may couple to one or more bus systems 204 chosen for compatibility with the processors 202.

The packet analysis systems 114 may also include one or more instances of computer-readable storage media 206, which couple to the bus systems 204. The bus systems 204 may enable the processors 202 to read code and/or data to/from the computer-readable storage media 206. The media 206 may represent storage elements implemented using any suitable technology, including but not limited to semiconductors, magnetic materials, optics, or the like. The media 206 may include memory components, whether classified as RAM, ROM, flash, or other types, and may also represent hard disk drives.

The storage media 206 may include one or more modules of instructions that, when loaded into the processor 202 and executed, cause the act analysis systems 114 to perform various techniques for centralized analysis and management of network packets. As detailed throughout this description, these modules of instructions may also provide various means by which the systems 114 may participate in the techniques for centralized analysis and management of network packets, using the components, flows, and data structures discussed in more detail throughout this description. For example, the storage media 206 may include one or more software modules that provide a packet analysis process 208. In addition, the storage media 206 may also include any number of data storage structures accessible to the packet analysis process 208. For example, one or more instances of a packets store 210 may receive and store packets, carried forward at 116, as detected by packet detecting devices (e.g., 108 in FIG. 1). As described above, the packets 116 may represent packets that are identified as malicious and discarded, and may also represent packets that are identified for analysis but not necessarily malicious. In turn, the packets store 210 may provide the packets, denoted at 212, upon request to the packet analysis process 208.

Turning to the packet analysis process 208 in more detail, block 214 represents defining one or more baseline patterns of behavior expected of a given network (e.g., 106 in FIG. 1). For example, at a given time, a certain level of network traffic may be expected, and block 214 may include establishing this expected level of network traffic as a baseline. As a more concrete example, block 214 may include establishing a baseline indicating how many packets a given computer system is expected to receive per unit time.

Block 216 represents defining a threshold for any deviations from the baseline patterns established in block 214. For example, having established a certain level of network traffic as a baseline expectation in block 214, block 216 may include establishing a threshold above and/or below this baseline expectation. Any deviations beyond these thresholds may be evidence of abnormal network behavior (e.g., attacks, or other malicious or adversarial actions). For example, having established a baseline indicating how many packets a given computer system is expected to receive, the threshold established in block 216 may define a window of permissible network behavior, falling either above or below the baseline. More specifically, an excessive number of packets directed to a given computer system may be evidence of a distributed denial-of-service attack. This description elaborates further on blocks 214 and 216 below in FIG. 3.

Decision block 218 represents awaiting the arrival of packets from one or more of the packet detecting devices (e.g., 108 in FIG. 1). The packet analysis process 208 may loop at block 218, as represented by No branch 220, pending the arrival of packets 116 for storage in the packets store 210. From decision block 218, when a given packet arrives for analysis, the packet analysis process 208 may take Yes branch 222 to block 224, which represents analyzing the packet. In turn, block 226 represents identifying any patterns occurring within the packets. This description elaborates further on blocks 224 and 226 in FIG. 4 below. Finally, decision block 228 represents determining whether the analysis and pattern identification performed in blocks 224 and 226 indicates a deviation in network behavior that exceeds the threshold defined in block 216.

From decision block 228, if the network behavior deviates beyond the applicable threshold, the packet analysis process 208 may take Yes branch 230 to block 232, which represents remediating the deviation. This description elaborates further on block 232 below in FIGS. 5 and 6. In some cases, any deviation identified in the process flows 200 may be attributable to malicious conduct, and remediated as shown in block 232. In other cases, these deviations may be attributable to non-malicious factors, such as growth in bandwidth allocated to particular systems, growth patterns occurring within different geographic regions, or the like. In these latter scenarios, in which deviations are not attributable to malicious actions, block 233 represents adjusting the thresholds and/or baseline patterns to account for non-malicious factors.

After performing block 232 and/or 233, the packet analysis process 208 may repeat, at least in part. For example, in some cases, the packet analysis process may adjust baseline patterns and/or thresholds applicable to these baselines. In other cases, the packet analysis process may leave these baselines and thresholds unchanged, and await the arrival of the next packet or group of packets from the packet detecting devices.

Returning to decision block 228, if the deviation in network behavior does not exceed any applicable threshold, the packet analysis process 208 may take No branch 234 to return to a previous point in the processing. As described in the previous paragraph, the packet analysis process 208 may await the arrival of the next packet or packets for analysis, or may adjust the baselines and applicable threshold as appropriate. FIG. 2 provides an example in which the packet analysis process 208 awaits the next packet, with the understanding that other implementations are possible as well.

Having presented an overview of the packet analysis process 208 in FIG. 2, the discussion now proceeds to a more detailed description of establishing baselines and thresholds applicable to these baselines. This description is now provided with FIG. 3.

Figure 3:
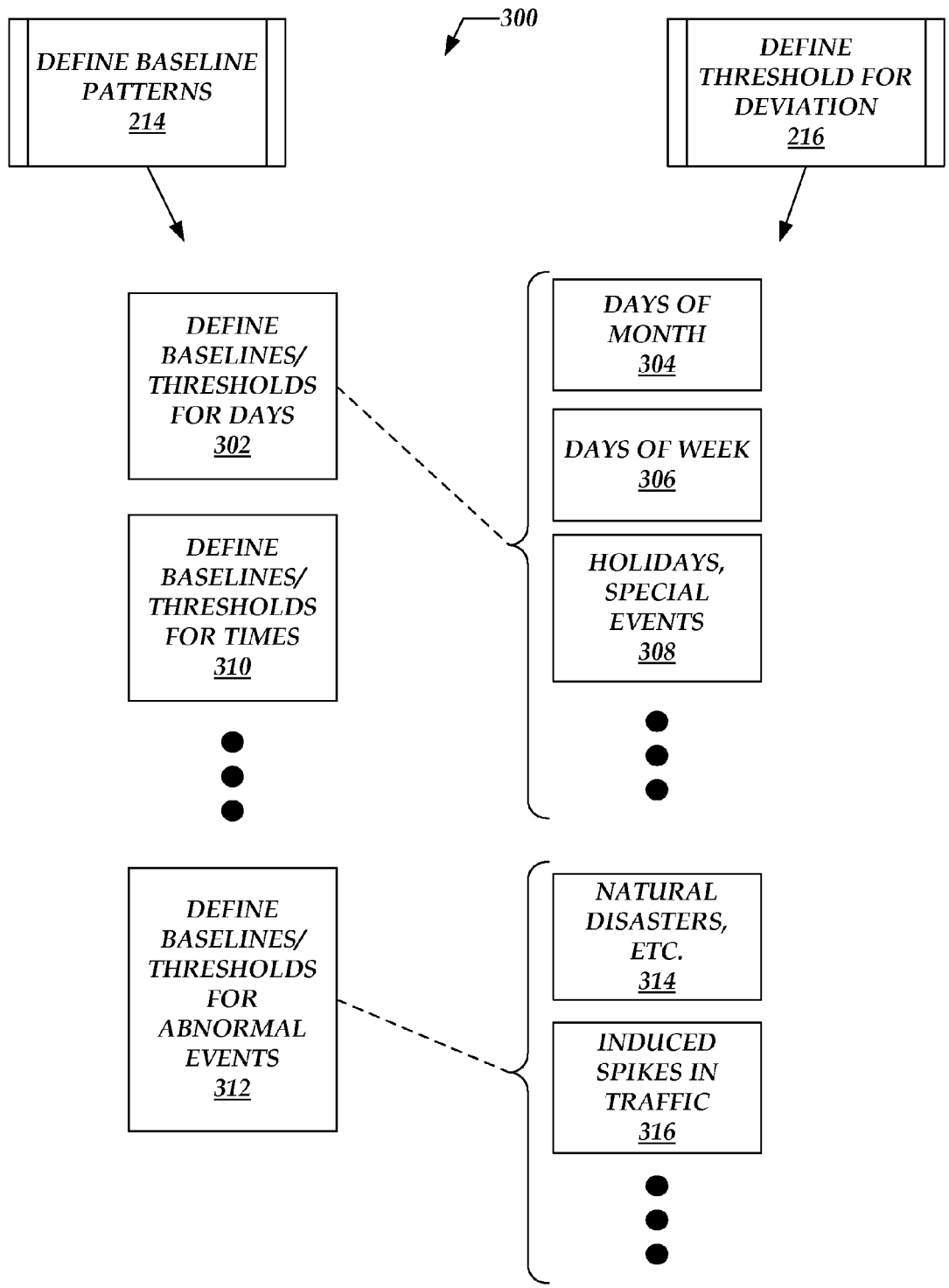
FIG. 3 is a flow diagram elaborating further on defining baseline patterns, and defining thresholds applicable to these baselines, according to exemplary embodiments.

FIG. 3 illustrates process flows, denoted generally at 300, that elaborate further on defining baseline patterns and defining thresholds applicable to these baselines. For convenience of description, but not to limit possible implementations, FIG. 3 may carry forward some items introduced in previous drawings, and may refer to such items by identical reference numbers. For example, FIG. 3 carries forward blocks 214 and 216 from FIG. 2, with the understanding that the assessing shown in FIG. 3 may elaborate further on higher-level processing represented in these blocks.

Turning to FIG. 3 in more detail, block 214 may include defining baselines and/or applicable thresholds with respect to particular days, as represented generally in block 302. For example, block 302 may include defining baselines and/or thresholds with respect to particular days or dates within a month, as represented in block 304. More particularly, on the first day of a given month, the network may be expected to exhibit certain behavior, and on the last day of a given month, the network may be expected to exhibit other certain behavior.

Elaborating further on block 302, block 306 represents defining baselines and/or thresholds with respect to particular days of the week. For example, the particular seven days a week may be associated with certain expected levels of network behavior. More specifically, the network may be expected to exhibit certain levels of behavior on particular weekdays, and certain other levels of behavior on weekends. In addition, as represented generally at block 308, baselines and/or thresholds may be defined for holidays, or other special events.

Block 310 represents defining baselines and/or thresholds with respect to particular times of day. For example, within a given 24-hour period, the network may be expected to exhibit certain levels of behavior. It is noted that baselines and applicable thresholds may be defined with respect to both days and times of day, thereby combining the processing represented in block 302 and 310.

In general, the processing represented by block 302-310 may represent defining baselines and/or thresholds with respect to recurring or predictable events. However, in some cases, the network may be affected by nonrecurring or unpredictable events. To account for such cases, denoted generally as abnormal events, block 312 represents defining baselines and/or thresholds applicable to network behavior, should such nonrecurring or unpredictable events occur. For example, block 314 represents defining baselines and/or thresholds applicable to network behavior in the event of natural disasters, acts of war, or other such nonrecurring or unpredictable events affecting certain geographic regions served by the network. As a more concrete example, if a hurricane is predicted to make landfall within a given geographic area, a communications network serving this area may be expected to experience spikes in traffic related to weather reports, emergency services, or the like.

As another example, block 312 may include defining baselines and/or thresholds to accommodate induced spikes in traffic, as represented generally by block 316. For example, a given software vendor may operate one or more websites, and may make patches, upgrades, service packs, or downloadable items available through these websites. When a given item becomes available for download, this website may experience a spike in demand, with this spike exceeding typical or ordinary demand otherwise experienced by the website.

Figure 4:
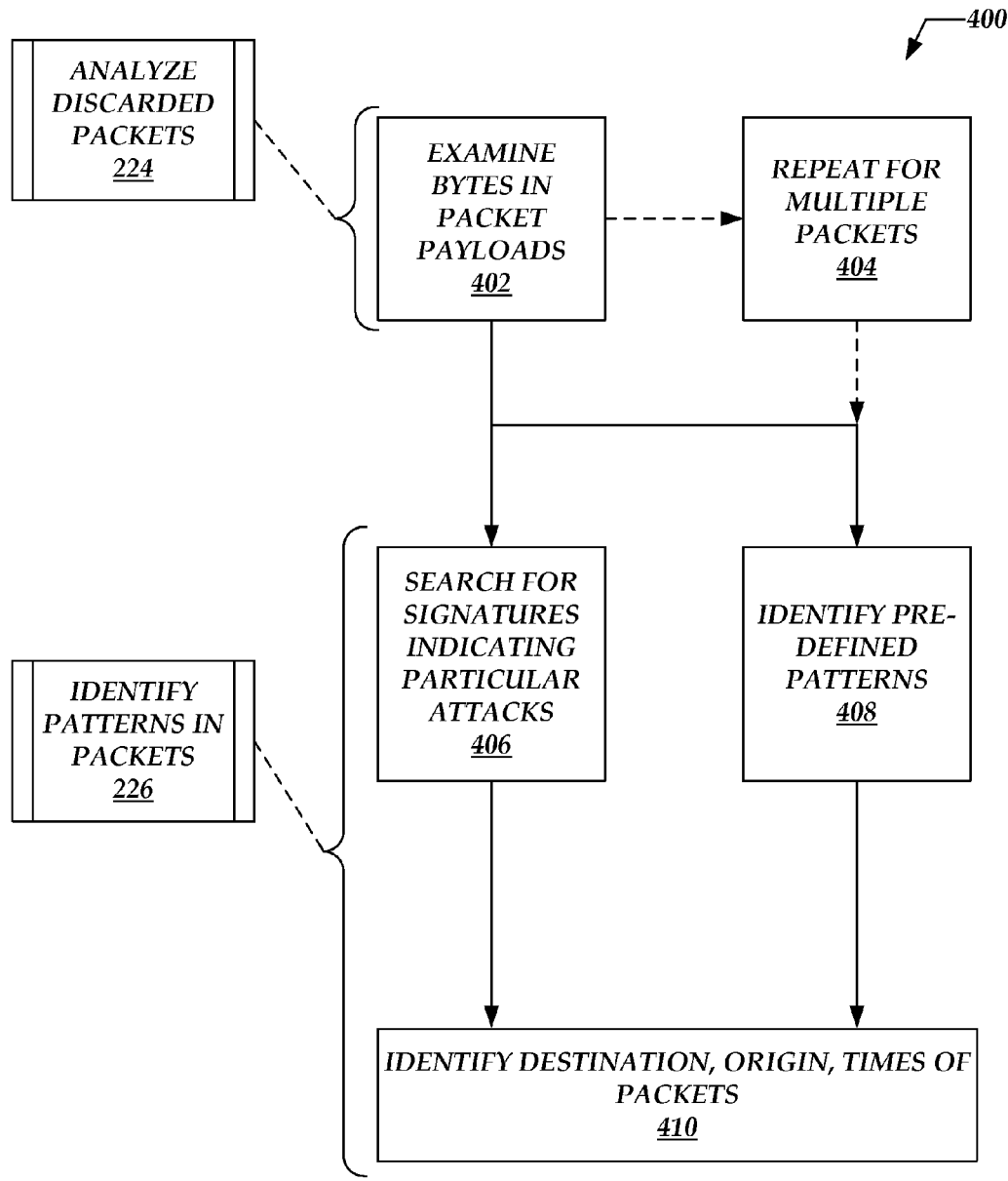
FIG. 4 is a flow diagram elaborating further on analyzing identified packets, and identifying patterns occurring within these identified packets, according to exemplary embodiments.

FIG. 4 illustrates process flows, denoted generally at 400, that elaborate further on analyzing packets, and identifying patterns occurring within these packets. For convenience of description, but not to limit possible implementations, FIG. 4 may carry forward some items introduced in previous drawings, and may refer to such items by identical reference numbers. For example, FIG. 4 carries forward blocks 224 and 226 from FIG. 2, with the understanding that the processing shown in FIG. 4 may elaborate further on higher-level processing represented in these blocks.

Turning to FIG. 4 in more detail, block 402 represents examining bytes stored within payload fields associated with particular packets. More specifically, block 402 may represent deconstructing particular packets, according to the appropriate format, to extract payload information. Block 404 represents repeating block 402 for any number of multiple packets. It is noted that blocks 402 and 404 may elaborate further on block 224.

Turning now to block 226, this block may include searching for signatures indicating particular attacks, as represented generally in block 406. For example, virus infections may transmit packets that contain particular characteristic signatures. As another example, distributed or coordinated attacks (e.g., denial-of-service attacks) may exhibit predefined or characteristic patterns. Block 408 represents identifying occurrences of these predefined or characteristic patterns. In addition, blocks 406 and/or 408 may include identifying the severity or level of any attacks exhibiting the signatures or patterns identified in these blocks.

Block 226 may also include identifying certain parameters associated with analyzed packets. As shown in block 410, examples of these parameters may include origins and/or destinations associated with particular packets, as well as dates and times at which particular packets are transmitted and/or received.

Figure 5:
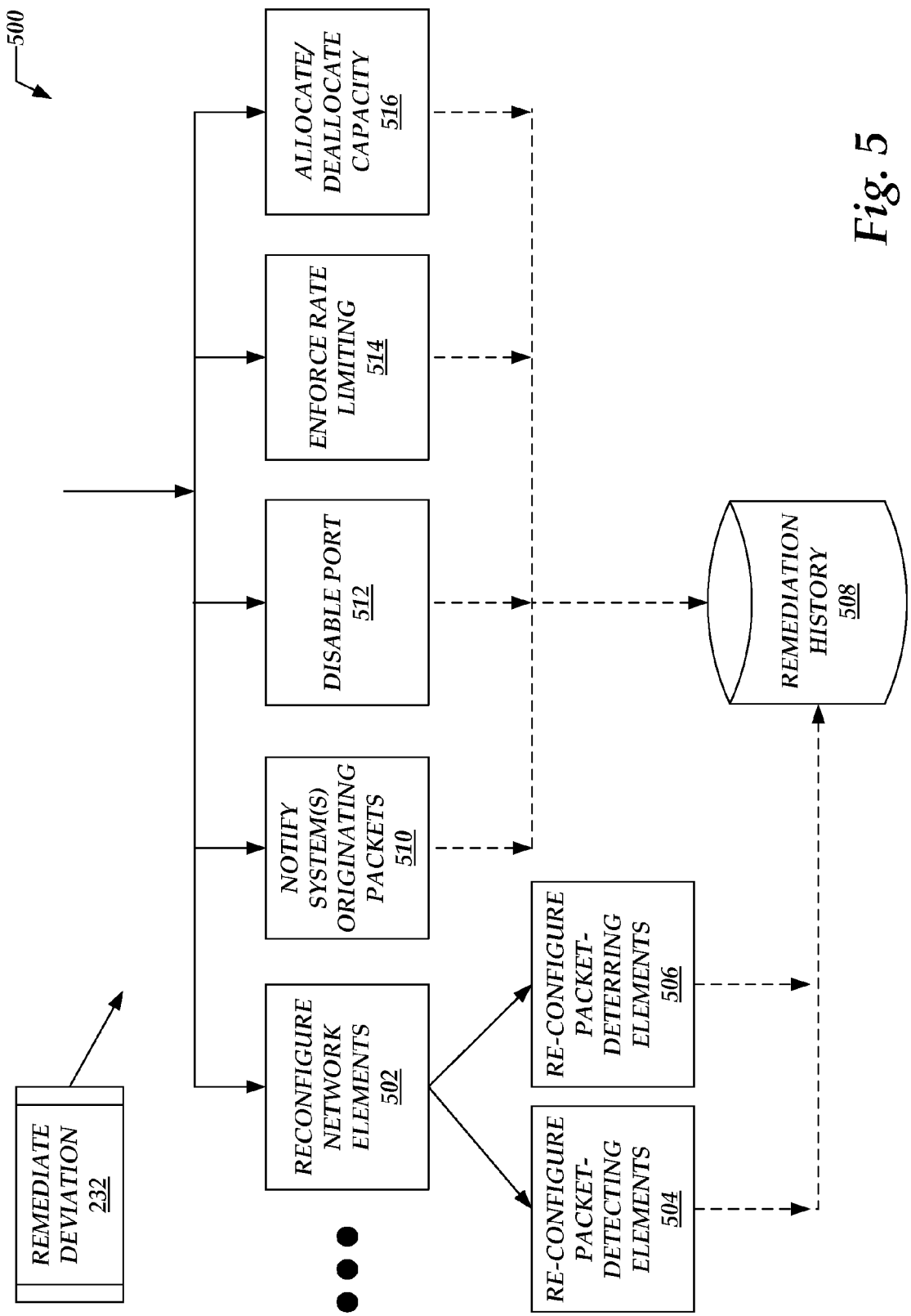
FIG. 5 is a flow diagram elaborating further on remediating deviations in network behavior, according to exemplary embodiments.

FIG. 5 illustrates process flows, denoted generally at 500, that elaborate further on remediating deviations in network behavior. For convenience of description, but not to limit possible implementations, FIG. 5 may carry forward some items introduced in previous drawings, and may refer to such items by identical reference numbers. For example, FIG. 5 carries forward block 232 from FIG. 2, with the understanding that the assessing shown in FIG. 5 may elaborate further on higher-level processing represented in this block.

Turning to FIG. 5 in more detail, block 502 represents reconfiguring one or more network elements to remedy the deviations detected within the network. For example, different elements or components within the network may have different capabilities. Some network elements may have the ability to detect packets, while other network elements may have the ability to reject or deter packets. Block 502 may include reconfiguring different types of network elements, taking into account their particular capabilities. For example, block 504 represents reconfiguring elements capable of detecting malicious packets, while block 506 represents reconfiguring network elements capable of deterring or rejecting malicious packets. In turn, block 232 may include storing information representing mediation efforts in a remediation history store 508, as represented by the various dashed arrows erected toward block 508.

Block 510 represents notifying systems, or personnel associated with such systems, that are transmitting or originating malicious packets. For example, referring briefly back to FIG. 1, the centralized packet analysis system 114 may detect that a given packet source 102 is originating malicious packets. This may indicate that the packet source 102 has been infected with a virus or other malware. In such a scenario, the packet analysis system 114 may, through block 510, so notify the packet source 102. Some, but not necessarily all, implementations of this description may perform block 510. More specifically, some implementations may omit block 510, particularly in scenarios in which notifying a given packet source may alert an attacker, and may cause the attacker to throttling or stopping attacks. If the attacker throttles or halts a given attack quickly, the attack may not be sufficiently diagnosed and remediated.

Returning to FIG. 5, block 232 may include reconfiguring an incoming port on which one or more malicious packets are arriving on the packet detecting devices (e.g., 108 in FIG. 1). For example, block 512 represents disabling this incoming port entirely. Block 514 represents enforcing a rate-limiting scheme or other ratcheting mechanism, as applicable to one or more incoming ports. These rate-limiting schemes or ratcheting mechanisms may reduce the exposure of protected computer systems (e.g., 112 in FIG. 1) to denial-of-service attacks, by restricting the rate of inbound packets admitted through the incoming ports.

In some cases, particular network components or elements may experience spikes in demand for legitimate reasons. In such cases, these otherwise legitimate demand spikes may appear to be deviations resulting from malicious attacks. Non-limiting examples of these demand spikes are discussed above with FIG. 3. These legitimate demand spikes may occur randomly, or may occur at predicted times. In such events, block 232 may include remediating legitimate demand spikes, for example, by allocating additional bandwidth or capacity to network components experiencing these demand spikes, as represented generally by block 516. In addition, as a given demand spike begins to lessen or relax, block 516 may include the allocating capacity or bandwidth from the network components.

In general, various techniques for remediating the deviations may be performed in response to specifications or direction provided by network service providers, customers or subscribers, or other entities involved with a network (e.g., 106). Any of these entities may specify which techniques to employ in response to the packet analysis provided in this description. These techniques may include facilitating manual intervention, providing fully-automated responses, or enabling limited automated responses with the ability to escalate to manual responses, and the like.

Figure 6:
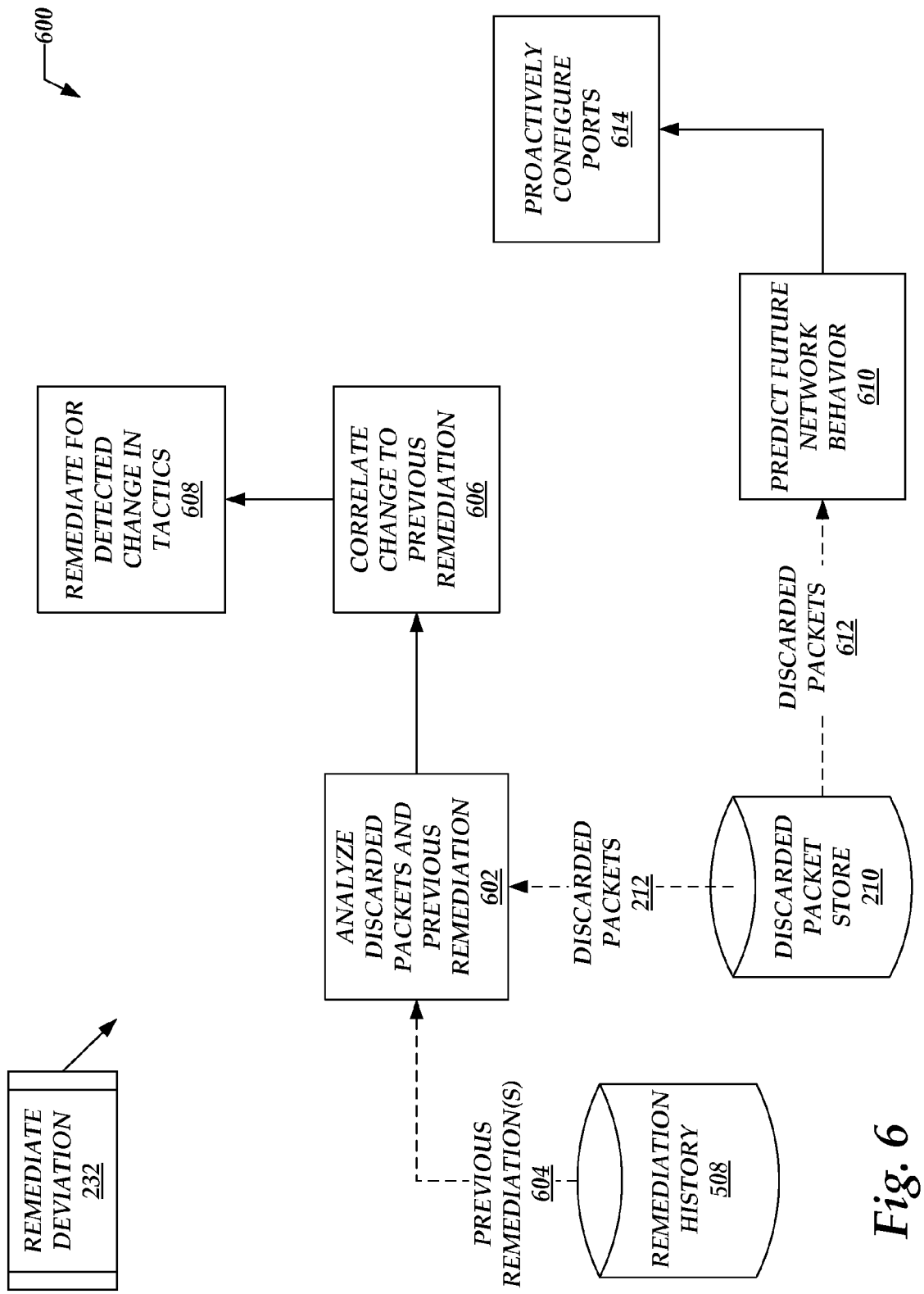
FIG. 6 is a flow diagram that illustrates further examples of remediating deviations detected in network behavior, according to exemplary embodiments.

FIG. 6 illustrates process flows, denoted generally at 600, that provide further examples of remediating deviations detected in network behavior. For convenience of description, but not to limit possible implementations, FIG. 6 may carry forward some items introduced in previous drawings, and may refer to such items by identical reference numbers. For example, FIG. 6 carries forward block 232 from FIG. 2, with the understanding that the assessing shown in FIG. 6 may elaborate further on higher-level processing represented in this block.

Turning to FIG. 6 in more detail, in some cases, a given attacker or adversary may change its tactics in response to remediation efforts undertaken by the centralized packet analysis system 114. In such scenarios, block 232 may include reviewing packets 212, as presented generally at 602. Block 602 may include reviewing packets 212 retrieved from the packets store 210, and comparing these packets to information 604 representing previous remediation efforts.

In turn, block 606 represents correlating the packets 212 with previous remediation efforts represented at 604. For example, the remediation history 508 may indicate that the packet analysis system 114 addressed a given denial-of-service attack from a given attacker through a given remediation effort. However, a subsequent stream of packets 212 may indicate that the given attacker has reacted to the remediation effort, and changed tactics accordingly. For example, the attacker may continue the denial-of-service attack by redirecting packets through intermediate nodes in the network.

Block 608 represents remediating for a detected change in tactics. For example, block 608 may include performing any of the above remediation techniques (or others as well), in response to detecting that a given attacker or adversary has changed tactics in response to previous remediation efforts. In turn, block 608 may also include updating the remediation history 508 with information representing these subsequent remediation efforts. In this manner, the centralized packet analysis system 114 may protect against ongoing attacks, using information gathered from a plurality of different packet detecting devices 108.

Continuing with FIG. 6, block 610 represents analyzing a stream of packets 612, gathered from a plurality of different packet detecting devices 108. In some cases, these different detecting devices 108 may be associated with different networks or different service providers. In this manner, the packet analysis system 114 may obtain a wider scope of visibility across one or more networks, as compared to the more limited scope of visibility available to the individual packet detecting devices 108. Block 610 may include predicting future network behavior, based at least in part on historical behavior information as represented in the packets 612.

This historical behavior information, as well as future behavior predicted therefrom, may serve to inform the processes represented in blocks 214 and 216 in FIG. 2. As described above, these blocks 214 and 216 represent defining baselines and thresholds for deviation from those baselines.

Block 614 represents proactively configuring ports or other structures associated with network components or elements, in response to the future network behavior predicted in block 610. In this manner, the packet analysis system 114 may be proactive, rather than reactive, in nature, and may pre-configure the network elements to anticipate future events (e.g., spikes or valleys in demand, packet traffic, or the like).

Having provided the above description, implementations of this description may realize various benefits. For example, the techniques described herein may reduce operation time for system administrators to track and trace down malicious packets that have appeared previously, and may prevent the intrusion of future packets (providing a measure of proactive future maintenance). These techniques may also provide a history log containing malicious and/or analyzed packets, with this log further enabling system admins or engineers to evaluate the nature/contents of such packets. This history log may be synced with entries within a trouble ticketing system at a given time, as maintained by a given network service provider. This synchronization may be helpful for both a system admin (e.g., by reducing testing and troubleshooting time by viewing all related packets info in history log) and for a vendor (e.g., by providing status of trouble tickets, and projected time to fix/resolve particular trouble tickets).

These techniques may allow for system engineering based on preventive trending, rather than reactive trending. These techniques may enable information sharing among divergent or different types of networks that, under normal operating conditions, would otherwise have no relationships with one another. These techniques may also incorporate changes from ongoing efforts and initiatives related to improving network performance. Examples of such efforts may include evaluating and simplifying access control list (ACL) filters within various network environments (e.g., the network layer), where network elements (e.g., digital subscriber line access multiplexers (DSLAMs), switches, routers, and the like) may reside. Other examples may include initiatives to analyze the impact of increasing traffic rates and network data throughput through various firewall platforms, to measure the performance of these firewalls under such conditions. Without limiting possible implementations, these evaluations may be performed with initiatives such as Internet Protocol Television (IPTV), distribution of digital multi-media, and the like. Third-party vendors may include these techniques, in whole or in part, in their own product designs. These techniques may also be implemented internally within a given network environment, or may be implemented externally across a plurality of different network environments.

CONCLUSION

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

Based on the foregoing, it should be appreciated that apparatus, systems, methods, and computer-readable media for centralized analysis and management of network packets are provided herein. Although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the claimed subject matter, which is set forth in the following claims.

What is claimed is:

1. A non-transitory computer-readable storage medium having computer-executable instructions stored thereon that, when executed by a computer, cause the computer to at least:
   receive and store a first plurality of packets identified by a plurality of packet-detecting devices within a network;
   define a baseline behavior pattern applicable to a behavior of the network;
   define a threshold applicable to a deviation of the behavior of the network from the baseline behavior pattern;
   perform a first analysis of the first plurality of packets to identify a first abnormal deviation in the baseline behavior pattern that exceeds the threshold;
   identify a first attack against the network, as exhibited by the first abnormal deviation;
   provide a first remedy for the first abnormal deviation to recover from the first attack;
   receive and store a second plurality of packets identified by the plurality of packet-detecting devices within the network;
   perform a second analysis of the second plurality of packets to identify a second abnormal deviation in the baseline behavior pattern that exceeds the threshold;
   identify a second attack against the network, as exhibited by the second abnormal deviation;
   compare the second plurality of packets to the first remedy to determine that the second abnormal deviation is caused by a change from first attack tactics used for the first attack to second attack tactics used for the second attack, the first attack tactics being changed to the second attack tactics in response to the first remedy; and
   provide a second remedy based on the change from the first attack tactics to the second attack tactics.

2. The non-transitory computer-readable storage medium of claim 1, wherein the first plurality of packet and the second plurality of packets comprise a malicious packet discarded by the plurality of packet-detecting devices and a packet identified as requiring further analysis.

3. The non-transitory computer-readable storage medium of claim 1, wherein providing the first remedy for the first abnormal deviation comprises reconfiguring a packet-detecting device of the plurality of packet-detecting devices within the network.

4. The non-transitory computer-readable storage medium of claim 1, wherein providing the first remedy for the first abnormal deviation comprises reconfiguring a packet-deterring element within the network.

5. The non-transitory computer-readable storage medium of claim 1, wherein providing the first remedy for the first abnormal deviation comprises notifying a network element that is originating the first plurality of packets.

6. The non-transitory computer-readable storage medium of claim 1, wherein providing the first remedy for the first abnormal deviation comprises enforcing a rate limiting scheme applicable to a port of a packet-detecting device of the plurality of packet-detecting devices.

7. The non-transitory computer-readable storage medium of claim 1, wherein providing the first remedy for the first abnormal deviation comprises allocating network capacity to at least one component within the network.

8. The non-transitory computer-readable storage medium of claim 1, wherein the baseline behavior pattern and the threshold are defined based on a particular day of a week.

9. The non-transitory computer-readable storage medium of claim 1, wherein the baseline behavior pattern and the threshold are defined based on a particular day within a month.

10. The non-transitory computer-readable storage medium of claim 1, wherein the baseline behavior pattern and the threshold are defined based on a recurring event.

11. The non-transitory computer-readable storage medium of claim 1, wherein the baseline behavior pattern and the threshold are defined based on a non-recurring event.

12. The non-transitory computer-readable storage medium of claim 1, wherein the baseline behavior pattern and the threshold are defined based on an induced spike in network traffic.

13. A centralized packet analysis system for analyzing and managing packets of a network, the centralized packet analysis system comprising at least:
    a processor; and
    memory coupled to the processor, the memory comprising instructions configured to enable the processor to:
        receive and store a first plurality of packets identified by a plurality of packet-detecting devices within a network,
        define a baseline behavior pattern applicable to a behavior of the network,
        define a threshold applicable to a deviation of the behavior of the network from the baseline behavior pattern,
        perform a first analysis of the first plurality of packets to identify a first abnormal deviation in the baseline behavior pattern that exceeds the threshold,
        identify a first attack against the network, as exhibited by the first abnormal deviation,
        provide a first remedy for the first abnormal deviation to recover from the first attack,
        receive and store a second plurality of packets identified by the plurality of packet-detecting devices within the network,
        perform a second analysis of the second plurality of packets to identify a second abnormal deviation in the baseline behavior pattern that exceeds the threshold,
        identify a second attack against the network, as exhibited by the second abnormal deviation,
        compare the second plurality of packets to the first remedy to determine that the second abnormal deviation is caused by a change from first attack tactics used for the first attack to second attack tactics used for the second attack, the first attack tactics being changed to the second attack tactics in response to the first remedy, and
        provide a second remedy based on the change from the first attack tactics to the second attack tactics.

14. The centralized packet analysis system of claim 13, wherein identifying the attack against the network comprises identifying predefined patterns appearing within the first plurality of the packets, wherein the predefined patterns are associated with particular types of attacks.

15. The centralized packet analysis system of claim 13, wherein the processor is further enabled to store the first remedy and the second remedy in a remediation history.

16. The centralized packet analysis system of claim 13, wherein the processor is further enabled to predict a future behavior of the network, based at least in part on analyzing the first plurality of the packets and the second plurality of the packets.

17. The centralized packet analysis system of claim 16, wherein the processor is further enabled to proactively configure a network element in response to the future behavior of the network.

18. A method for analyzing and managing packets of a network, the method comprising at least:
    receiving and storing a first plurality of packets identified by a plurality of packet-detecting devices within a network;
    defining a baseline behavior pattern applicable to a behavior of the network;
    defining a threshold applicable to a deviation of the behavior of the network from the baseline behavior pattern;
    performing a first analysis of the first plurality of packets to identify a first abnormal deviation in the baseline behavior pattern that exceeds the threshold;
    identifying a first attack against the network, as exhibited by the first abnormal deviation;
    providing a first remedy for the first abnormal deviation to recover from the first attack;
    receiving and storing a second plurality of packets identified by the plurality of packet-detecting devices within the network;
    performing a second analysis of the second plurality of packets to identify a second abnormal deviation in the baseline behavior pattern that exceeds the threshold;
    identifying a second attack against the network, as exhibited by the second abnormal deviation;
    comparing the second plurality of packets to the first remedy to determine that the second abnormal deviation is caused by a change from first attack tactics used for the first attack to second attack tactics used for the second attack, the first attack tactics being changed to the second attack tactics in response to the first remedy; and
    providing a second remedy based on the change from the first attack tactics to the second attack tactics.

* * * * *